(12) United States Patent
Skelcher et al.

(10) Patent No.: US 7,198,125 B2
(45) Date of Patent: Apr. 3, 2007

(54) CAB SUPPORT SYSTEM FOR AN AGRICULTURAL VEHICLE

(75) Inventors: Michael D. Skelcher, Essex (GB); Graeme J. Yorwarth, Essex (GB)

(73) Assignee: CNH America LLC, New Holland, PA (US)

( * ) Notice: Subject to any disclaimer, the term of this patent is extended or adjusted under 35 U.S.C. 154(b) by 318 days.

(21) Appl. No.: 10/715,301

(22) Filed: Nov. 17, 2003

(65) Prior Publication Data

US 2004/0134700 A1 Jul. 15, 2004

(30) Foreign Application Priority Data

Nov. 16, 2002 (GB) .................. 0226843.1

(51) Int. Cl.
*B62D 33/10* (2006.01)
(52) U.S. Cl. ............... 180/89.13; 180/89.14; 296/190.07
(58) Field of Classification Search ............ 180/89.13, 180/89.14, 89.15; 296/190.07, 35.1; 267/64.16, 267/64.17; 303/115.1–115.5; 280/124.106, 280/124.16
See application file for complete search history.

(56) References Cited

U.S. PATENT DOCUMENTS

| | | | | | |
|---|---|---|---|---|---|
| 3,784,228 | A | * | 1/1974 | Hoffmann et al. ........ | 280/6.158 |
| 3,958,654 | A | * | 5/1976 | LeSalver et al. ............ | 180/291 |
| 3,963,261 | A | * | 6/1976 | Hiruma ....................... | 280/683 |
| 4,410,006 | A | | 10/1983 | Moulton | |
| 4,463,818 | A | * | 8/1984 | Sonneborn ................ | 180/89.15 |
| 4,483,409 | A | * | 11/1984 | Fun .......................... | 180/89.15 |
| 4,506,751 | A | * | 3/1985 | Stephens .................. | 180/89.15 |
| 4,513,845 | A | * | 4/1985 | Stephens et al. .......... | 188/299.1 |
| 4,761,020 | A | * | 8/1988 | Eckel et al. ............. | 267/64.11 |
| 5,044,455 | A | * | 9/1991 | Tecco et al. ............. | 180/89.13 |
| 5,054,808 | A | * | 10/1991 | Tsukamoto .................. | 280/5.5 |
| 5,087,073 | A | * | 2/1992 | Lund ....................... | 188/266.2 |
| 5,116,077 | A | * | 5/1992 | Karnopp et al. ......... | 280/5.502 |
| 5,139,104 | A | * | 8/1992 | Moscicki ................. | 180/89.13 |
| 5,562,305 | A | * | 10/1996 | Heyring ................... | 280/5.507 |
| 5,603,387 | A | * | 2/1997 | Beard et al. ............. | 180/89.12 |
| 5,623,410 | A | * | 4/1997 | Furihata et al. ............... | 701/37 |
| 5,725,066 | A | * | 3/1998 | Beard et al. ............. | 180/89.12 |
| 6,029,764 | A | * | 2/2000 | Schubert .................. | 180/89.13 |
| 6,039,326 | A | * | 3/2000 | Agner ...................... | 280/5.506 |
| 6,070,681 | A | * | 6/2000 | Catanzarite et al. ..... | 180/89.15 |
| 6,073,714 | A | * | 6/2000 | McHorse et al. ........ | 180/89.14 |
| 6,250,658 | B1 | * | 6/2001 | Sakai .................. | 280/124.106 |
| 6,273,203 | B1 | | 8/2001 | Paggi et al. | |
| 6,517,094 | B1 | * | 2/2003 | Kincaid et al. ....... | 280/124.106 |
| 6,820,877 | B1 | * | 11/2004 | Ichimura et al. ......... | 280/6.157 |
| 6,948,580 | B2 | * | 9/2005 | Scholten et al. ......... | 180/89.14 |

* cited by examiner

*Primary Examiner*—Paul N. Dickson
*Assistant Examiner*—George D. Spisich
(74) *Attorney, Agent, or Firm*—Stephen A. Bucchianeri; John William Stader; Michael G. Harms

(57) ABSTRACT

An agricultural vehicle includes a chassis and a cab supported on the chassis by means of a support system which maintains the cab level. The support system comprises two pairs of hydraulic actuators. Each pair of actuators is operative to tilt the cab relative to the chassis about a respective one of two mutually inclined axes. The two actuators of each pair are connected to a common pumping element in such a manner that whenever the volume of hydraulic fluid in one of the actuators in the pair is reduced, the volume of hydraulic fluid in the other actuator of the same pair is correspondingly increased.

10 Claims, 3 Drawing Sheets

CAB SUPPORT SYSTEM FOR AN AGRICULTURAL VEHICLE

FIELD OF THE INVENTION

The present invention relates to an agricultural vehicle having a chassis and a cab connected to the chassis by means of a support system which comprises two pairs of hydraulic actuators, each pair of actuators being operative to tilt the cab relative to the chassis about a respective one of two mutually inclined axes, so as to enable the cab to be maintained horizontal even when the ground is inclined.

BACKGROUND OF THE INVENTION

It is common to design agricultural vehicles, such as tractors, with a so-called structural engine. In such vehicles, the engine, together with the transmission and the rear axle, constitutes the rigid chassis of the vehicle. Because there is no suspension between the chassis and the ground, at least at the rear of the vehicle, shocks resulting from unevenness in the terrain are transmitted directly to the driver's cab.

To improve the comfort of the driver, it is known to pivot the cab about a transverse axis at its front end and to provide spring and damper units between the rear end of the cab and the chassis. This allows a cushioned up and down movement of the cab on the chassis.

While such a cab suspension goes some way towards improving the ride quality in the cab, it still suffers from the disadvantage that when the tractor is being driven along an incline, the cab and the driver's seat, though parallel to the ground, are inclined relative to the horizontal and this causes discomfort to the driver, aside from being disconcerting.

It is therefore desirable to provide the cab of an agricultural vehicle with a self-leveling support system which maintains the attitude of the cab substantially horizontal, even if the inclination of the ground over which the vehicle is travelling varies within certain limits.

In U.S. Pat. No. 6,273,203 B, there is disclosed a self-leveling support system that employs four hydraulic actuators capable of tilting the cab about mutually inclined axes and a control system for independently controlling each of the hydraulic actuators in dependence upon signals received from sensors, which can be constructed as inclinometers or gyroscopes.

In this known system, the fact that all four actuators can be independently controlled makes for a complicated control system. This is because the control algorithm needs to take into account of when an actuator is near the bottom or top of the stroke of an actuator and is therefore unable to bring about the required tilt of the cab. Furthermore, a powerful pump is required to be able to supply hydraulic fluid to four actuators sufficiently rapidly to counteract rapid changes in the inclination of the chassis.

SUMMARY OF THE INVENTION

With a view to mitigating at least some of the foregoing disadvantages of the prior art, the present invention provides an agricultural vehicle having a chassis and a cab connected to the chassis by means of a support system which comprises two pairs of hydraulic actuators, each pair of actuators being operative to tilt the cab relative to the chassis about a respective one of two mutually inclined axes, characterized in that the two actuators of each pair are connected to a common pumping element in such a manner that whenever the volume of hydraulic fluid in one of the actuators in a pair is reduced, the volume of hydraulic fluid in the other actuator of the same pair is correspondingly increased.

It is preferred for the four actuators to be arranged in a square formation, the actuators of each pair being located diagonally opposite one another.

Because each pumping element effectively acts to transfer hydraulic fluid from one actuator to the actuator diagonally opposite it, when one corner of the cab rises the opposite corner will fall by a corresponding amount. Consequently, the height of the cab relative to the chassis at a point between the two diagonally opposed corners will always remain the same. If that point lies at the intersection of the two diagonals, that point will define a virtual pivot point for the cab. Because the height of this point will not vary, the control system need not take special additional steps to avoid any of the actuators reaching the end of its stroke.

Furthermore, because the effective transfer of fluid from one of the actuators to the other in any pair only brings about a tilting of the cab and is not required to raise or lower the height of the virtual pivot point, it requires relatively little power. Expressed differently, when the cab is to be tilted about one of the two mutually inclined axes, the gain in potential energy at one corner is matched by a substantially equal loss of potential energy at the opposite corner. As the total potential energy of the cab relative to the chassis remains substantially constant, the transfer of fluid from one actuator to the other does not call for a high-power pumping element.

The pumping element referred to above may be constituted by a pump connected to the actuators of a pair, so that each pair is connected to a closed hydraulic circuit but hydraulic fluid is moved by the pump from one actuator to the other. The pump can in this case be electrically powered and may be of any suitable design, such as a vane pump.

It is however preferred for the pumping element to comprise a double acting cylinder, that is to say a jack having two working chambers separated from one another by a movable piston or diaphragm, each of the working chambers being connected in a closed circuit with a respective one of the two actuators of the pair. In this case, hydraulic fluid does not flow from one actuator to the other and each is instead arranged in its own closed circuit. The actuators in this embodiment of the invention may be regarded as two slave cylinders connected to two master cylinders that are arranged for operation in anti-phase with one another.

If the actuators are merely hydraulic cylinders, then the support system will set the horizontal attitude of the cab but will not act to absorb shocks. It would be possible to provide a separate spring and a damper between each actuator and the cab but it is preferred to form each actuator as a hydro-pneumatic suspension unit. Such a unit is well known per se and comprises a built-in air spring and damping arrangement, as will be described in greater detail below. In this case, each unit can itself cushion the ride in the cab and absorb shocks resulting from the vehicle being driven over rough ground, whereas as the interconnection between the diagonally opposed units will compensate for the inclination of the ground and maintain the cab level at all times.

When the inclination of the ground is too severe, the support system will not be able to maintain the cab horizontal. However, at this stage there is a risk of the tractor toppling and it is desirable to arrange for the support system to provide an alarm when the actuators are approaching the limit of their travel to warn the driver of the risk of toppling.

The cab should be connected to the chassis by a mechanical suspension geometry that allows the cab to pitch and roll but prevents it from translating longitudinally or transversely relative to the chassis. This may be achieved in a known manner by the suitable use of pivoted suspension links and panhard rods. It is also important to provide straps or other stops that limit the movement of the cab relative to the chassis in the event of the vehicle rolling over. As the suspension linkage and roll over protection system are not material to the present invention, they have been mentioned for completeness but it is not necessary for them to be described herein in any greater detail for an understanding of the invention.

In order to maintain the cab level, a sensor is preferably provided to detect the inclination of the cab. The prior art proposes costly inclinometers and gyroscopes for this purpose. There has recently been proposed a very inexpensive input device that can be used with a games computer in place of a joystick. Such a device, which will be described below in greater detail by reference to FIG. 3, is preferred as the means for sensing the inclination of the cab and can be connected to any part of the cab to be maintained horizontal, such as the driver's seat. It is of course possible to use other forms of inclinometer, but because of its application as a games controller, it is manufactured in large numbers and is therefore inexpensive. Aside from this, the output of the games controller can provide an indication of the magnitude of the deviation of its attitude from the horizontal, thereby enabling the control system of the support system to be simplified.

In principle, the output of the games controller is the error signal needed to energize the pumping element and can be supplied after only minor processing to a driver circuit of the pumping element. This provides the additional advantage that the speed of correction of the attitude of the cab will increase with the magnitude of its deviation from the horizontal, thereby providing rapid response without the risk of oscillation.

The pumping element, whether it is a pump or a double acting cylinder, is preferably powered by an electric motor but it is possible to use any other means of power that is available, such as hydraulic power. In this case, instead of controlling an electric motor, the control system associated with the support system may act on electrically controlled valves.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

Figure 1:
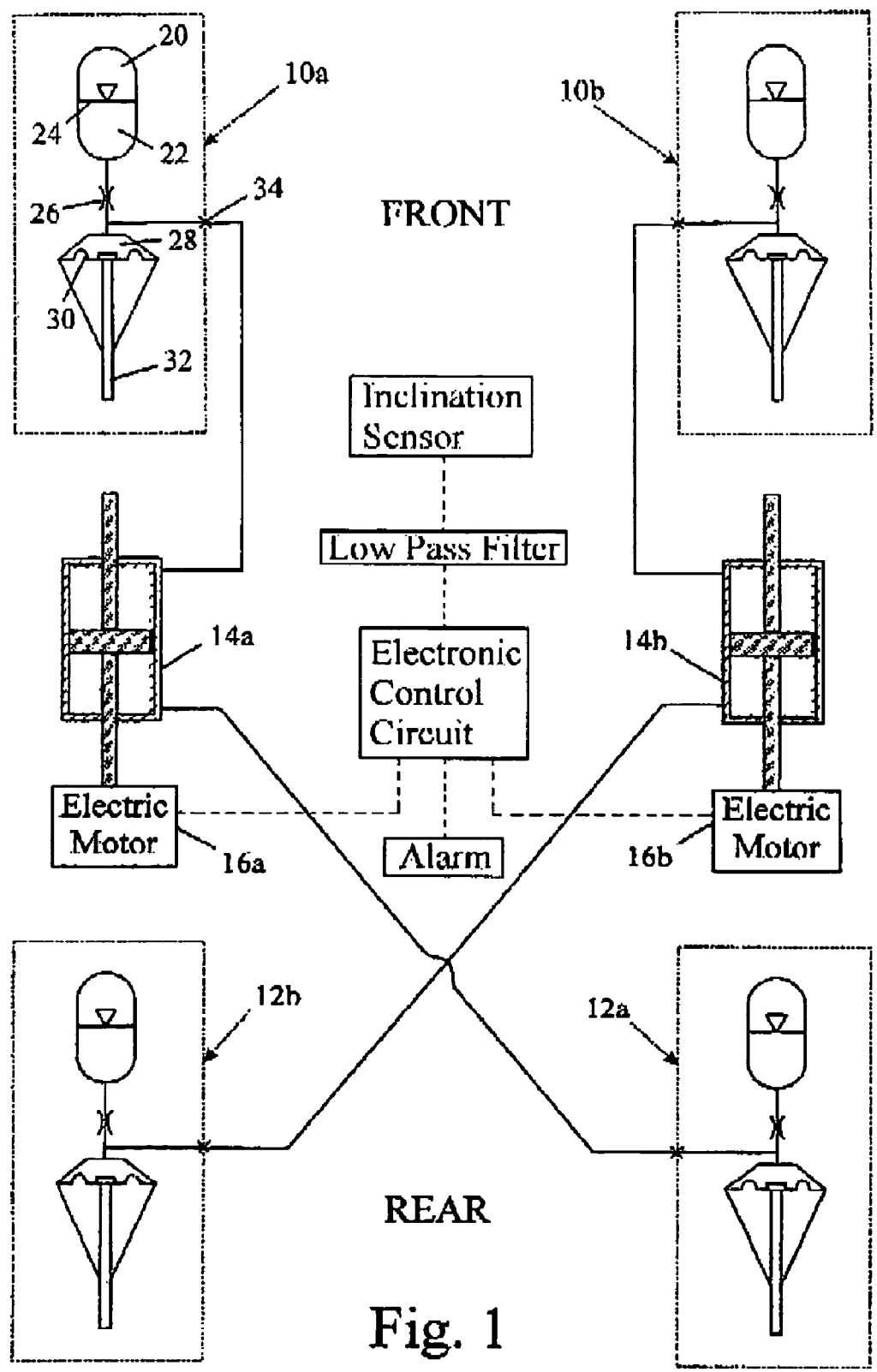
FIG. 1 is a schematic circuit diagram of a cab support system of a first embodiment.

The construction of a tractor with a cab having a leveling support system is already known and is described, for example, in the above mentioned U.S. Pat. No. 6,273,203B. To avoid unnecessary description, the latter specification is incorporated herein by reference. In the ensuing description, it will be assumed that the cab of a tractor is connected to a chassis by a suitable mechanical linkage which restricts forward and sideways movement of the cab but allows the cab to pitch and roll.

The support system illustrated in the drawings comprises four hydro-pneumatic units arranged in a square formation and acting between the cab and the chassis. Two of the units 10a and 10b are arranged at the front of the cab and two of the units 12b and 12a are arranged at the rear of the cab. The diagonally opposed units are paired so that the units 10a and 12a act as a first pair and the units 10b and 12b act as a second pair.

The hydro-pneumatic units are known per se and have been used in motor vehicle suspensions for many years. An example of such a unit is described in U.S. Pat. No. 4,410,006 which is also incorporated herein by reference to avoid description of the internal construction of the unit. The operation of each of the units can be understood sufficiently for the purposes of the present invention from their schematic representation in the drawings and the brief description below.

Each unit comprises an air pocket 20 separated from a chamber 22 filled with hydraulic fluid by a diaphragm 24. The chamber 22 communicates through a throttle 26 with a second, variable-volume, working chamber 28 bounded by a second diaphragm 30. The diaphragm 30 acts on a rod 32 connected to the chassis, all other parts of the unit being connected to move with the cab. A connector 34 permits fluid to be pumped into and drained from the working chamber 28.

When the connector 34 is shut off, each unit acts as a spring and a shock absorber. The air pocket 20 serves as the spring. When the volume of the pocket 20 changes, the movement of the diaphragm 24 causes a corresponding change in the volume of the chamber 22 which results in fluid transfer between the chambers 22 and 28. The action of the throttle 26 is to limit the rate at which the volume of the chamber 22 can be changed and this provides the desired damping.

The transfer of fluid between the two chambers 22 and 28 does not significantly affect the height of the cab and as so far described each unit acts only to cushion the cab while the vehicle is being driven over rough terrain. If however fluid is pumped into a unit through the connector 34 then this will raise the cab and conversely if fluid is drained from the unit through the connector 34 then the cab will be lowered. Each unit therefore acts as hydraulic actuator for setting the cab height in addition to its shock absorbing function.

Though it is preferred to used hydro-pneumatic units which combine these two functions, it is important to note that it is only the operation of each unit as a hydraulic actuator that is relevant to the present invention. It would thus be alternatively possible to use hydraulic jacks interconnected in pairs to raise and lower the corners of the cab and to provide separate springs and dampers to absorb shocks.

Each of the pairs of hydro-pneumatic units is connected to a pumping element which in the embodiment of FIG. 1 is constituted by a double acting jack 14a, 14b of which the piston is driven by an electric motor 16a, 16b. When the piston of the jack 14a is raised, as viewed, by the electric motor 16a, fluid is pumped into the unit 10a to raise the front left side of the cab and at the same time an equal volume of fluid is drained from the unit 12a to lower the rear right side of the cab. Thus the cab is simply pivoted about an axis that runs from the front right of the cab to the rear left without its overall height above the chassis being altered. In the same way, the jack 14b pivots the cab about a second axis that runs from the front left to the rear right of the cab. As the two axes are mutually inclined, by the suitable positioning of the four hydro-pneumatic units, the cab can be maintained horizontal regardless of the inclination of the ground, up to a certain limit.

The jacks 14a and 14b are shown as having pistons but of course it is possible to replace each piston by a rolling diaphragm so as to ensure that no leakage can take place between the hydraulic circuits of the diagonally opposite units.

Figure 2:
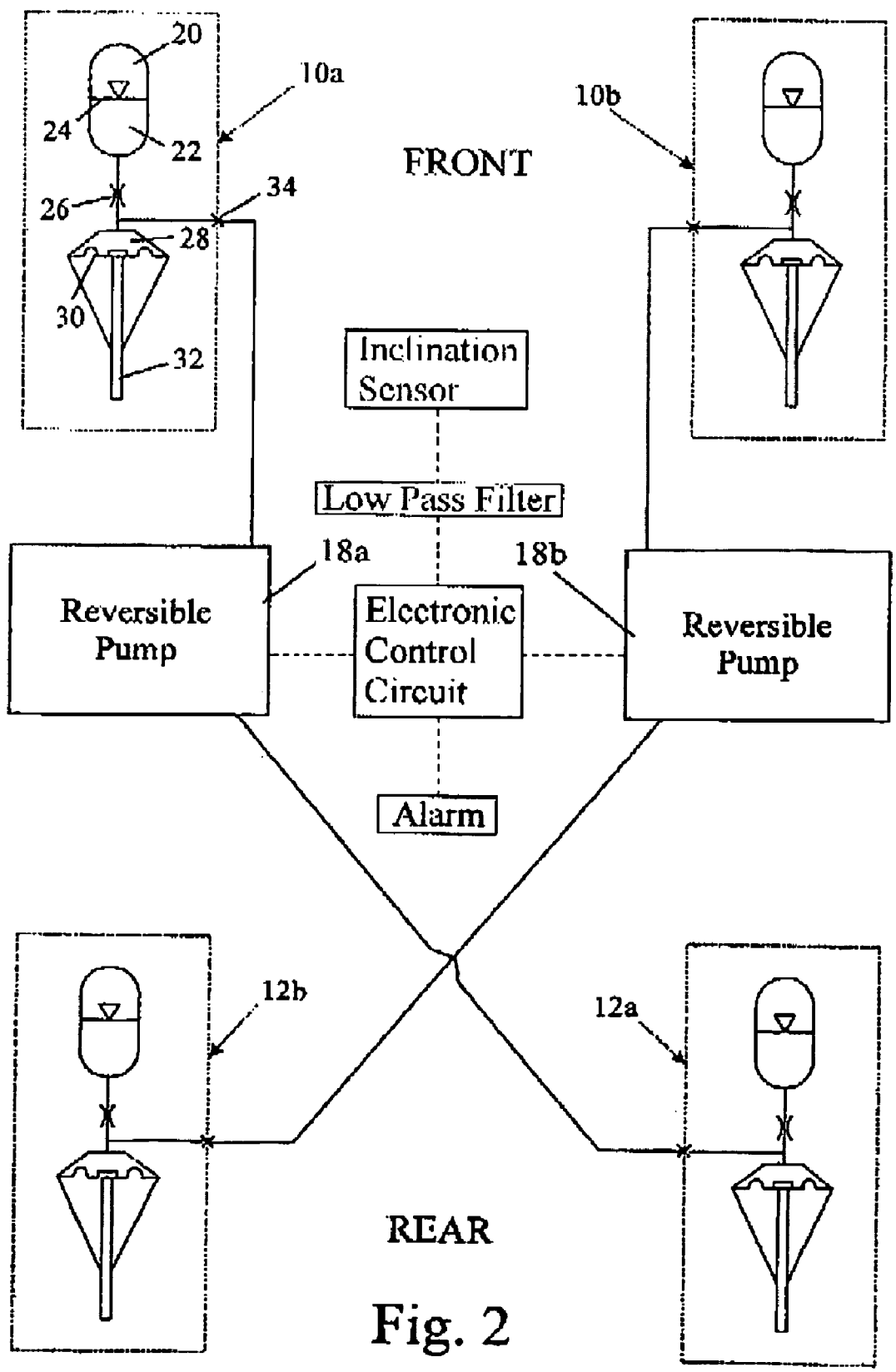
FIG. 2 is a similar view to FIG. 1 showing the support system of an alternative embodiment.

As the operation of the jack is simply to drain one unit at the same time as pumping fluid into the other, it is possible, as shown in FIG. 2, to replace the jacks 14a, 14b and electric motors 16a, 16b by reversible pumps 18a and 18b. The only difference between the two embodiments is that in one case the hydraulic circuits of the units in each pair are totally isolated from one another whereas in the other the units are arranged in the same closed circuit. In both embodiments, the volume of hydraulic fluid in the combined hydraulic circuits of each pair of units is constant and there is therefore no requirement for connection to an external supply or drain. Furthermore, there is no communication between the hydraulic circuits of the two pairs and the inclination of the cab about each of the two mutually inclined axes can be performed independently of the other.

Figure 3:
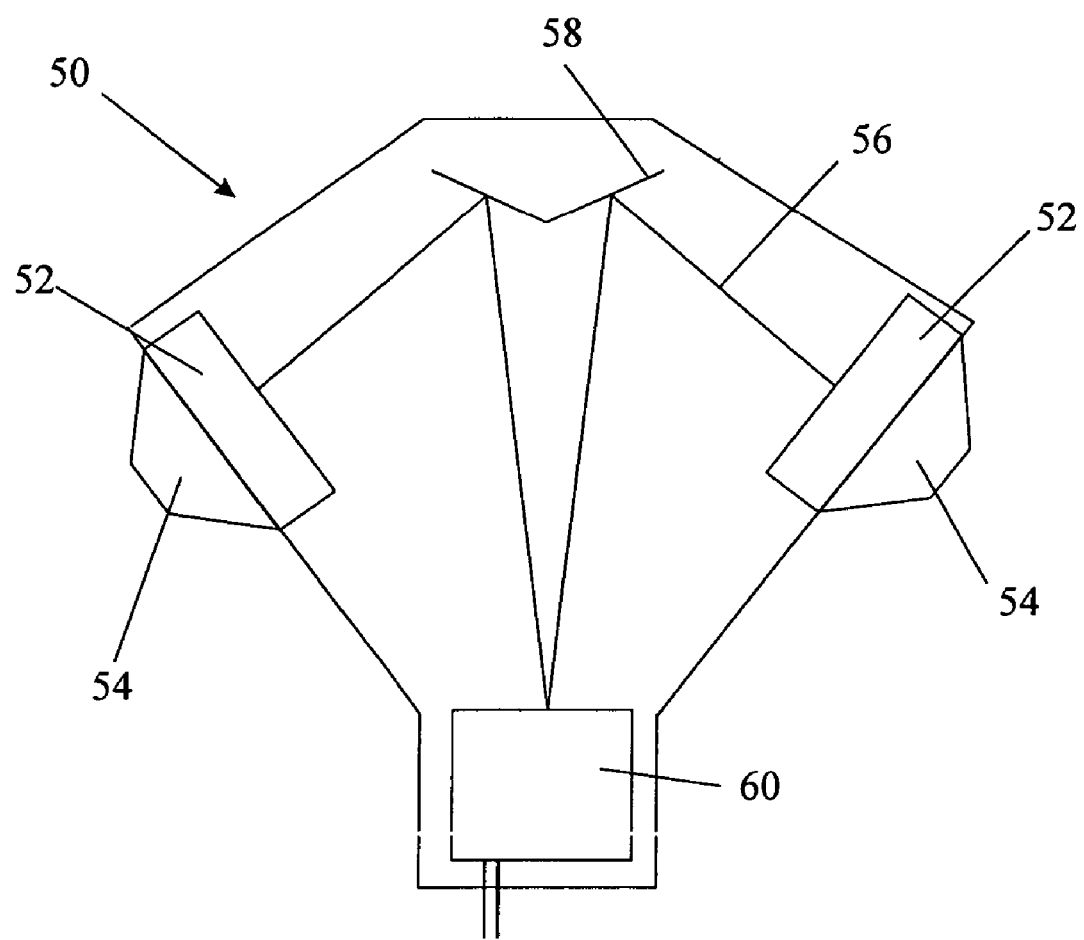
FIG. 3 is a schematic diagram showing the operation of a games controller that may be used as an inclinometer.

The signal for controlling the pumping elements in both embodiments is preferably provided by a games controller of the type shown in FIG. 3. The games controller 50 is essentially a sensitive inclinometer and it would be alternatively possible to use other forms of inclinometer.

Referring now to FIG. 3, the games controller 50 comprises two chambers 52, analogous to two, arched spirit-level indicators, oriented at 900 to one another. A single-point light source 54 behind each of the chambers 52 shines a beam through the arch and highlights the position of the bubble by a brighter point of light. The beam 56 through the bright point is then reflected off a mirror 58 and focused onto a CMOS sensor 60 which produces a signal corresponding to the position of the brightest point. The two light sources 54 operate alternately so that only one sensor 60 is required.

Whenever the sensor output indicates that the cab is inclined to the horizontal about one of its diagonal axes, the pumping element of the other diagonal is energized to tilt the cab in the direction necessary to return the cab to a horizontal attitude. The error signal from the inclinometer automatically performs proportional control in that the rate at which the pumping element will displace fluid to rectify an error in the attitude of the cab will increase with the magnitude of the error.

Though the pumping elements have been described as being electrically powered, it is of course alternatively possible for them to be hydraulically powered in which case the error signal from the inclinometer can be used to control electrically operated valves to regulate the rate at which fluid is pumped into and drained from the actuators of each pair.

The cab will pitch and roll with a high frequency when the vehicle is driven over uneven ground and the function of the support system of the cab is not to respond to each and every such tilting of the cab. The function of absorbing such shocks is performed by the springs and dampers that are built in to each of the hydro-pneumatic units. The invention seeks only to keep the average attitude of the cab horizontal when the cab is working on an incline. It is desirable therefore to filter the output signal of the sensor so that the self-leveling support system only responds to gradual or low frequency changes in the attitude of the cab.

When the piston of one of the double-acting jacks 14a, 14b is near the end of its stroke, this indicates that the vehicle is approaching an inclination at which it risks to topple. To prevent toppling, an alarm signal may be produced whenever the self-leveling support system approaches the limit of its range so that the driver may be alerted to the danger.

The invention claimed is:

1. An agricultural vehicle having a chassis and a cab connected to the chassis by means of a support system which comprises two pairs of hydraulic actuators, each pair of actuators being operative to tilt the cab relative to the chassis about a respective one of a first and second axes, wherein each pair of hydraulic actuators is connected in seperate closed circuits to a respective pumping element in such a manner that whenever the volume of hydraulic fluid in one of the actuators in a pair is reduced, the volume of hydraulic fluid in the other actuator of the same pair is correspondingly increased.

2. An agricultural vehicle as claimed in claim 1, wherein the two pairs of actuators are arranged in a square formation, the actuators of each pair being diagonally, hydraulically coupled.

3. An agricultural vehicle as claimed in claim 1, wherein each respective pumping element is a pump connected to the respective pair of actuators, each pair of actuators being connected in a common, closed, hydraulic circuit such that hydraulic fluid is moved by the pump within the closed circuit from one actuator to the other.

4. An agricultural vehicle as claimed in claim 1, wherein each respective pumping element comprises a cylinder having two working chambers separated from one another by a movable piston or diaphragm, each of the working chambers being connected in a closed circuit with a respective one of the two actuators of the pair.

5. An agricultural vehicle as claimed in claim 1, wherein each actuator comprises a hydro-pneumatic unit that additionally acts as a spring and damper.

6. An agricultural vehicle as claimed in claim 1, further comprising an alarm for generating an alarm signal when the support system approaches a limit of its adjustment range.

7. An agricultural vehicle as claimed in claim 1, wherein the pumping elements are controlled by an electronic control circuit that receives a signal from a sensor mounted for movement with the cab.

8. An agricultural vehicle as claimed in claim 7, wherein the sensor is constituted by an inclination sensor.

9. An agricultural vehicle as claimed in claim 7, wherein a low pass filter is provided for filtering the output signal of the sensor such that the support system will not respond to high frequency roll and pitch movements of the cab resulting from the vehicle travelling over uneven ground.

10. An agricultural vehicle having a chassis and a cab connected to the chassis by means of a support system comprising:
    a first pair of hydraulic actuators fluidly coupled in a first closed circuit;
    a second pair of hydraulic actuators fluidly coupled in a second closed circuit seperate from the first;
    a first pumping element fluidly coupled to the first pair of hydraulic actuators; and
    a second pumping element fluidly coupled to the second pair of hydraulic actuators;
    wherein each pair of actuators is operative to tilt the cab relative to the chassis about a respective one of a first and second axes, further wherein the fluid coupling between the first and second pairs and the first and second pumps is such that when the volume of hydraulic fluid in one of the actuators in a pair is reduced, the volume of hydraulic fluid in the other actuator of the same pair is correspondingly increased.

* * * * *